INVENTOR
Morgan F. Reynolds
BY
ATTORNEYS

Jan. 17, 1967  M. F. REYNOLDS  3,298,178
VARIABLE TORQUE CONVERTER
Filed July 16, 1965  2 Sheets-Sheet 2

INVENTOR
Morgan F. Reynolds

BY
ATTORNEYS

United States Patent Office 3,298,178
Patented Jan. 17, 1967

3,298,178
VARIABLE TORQUE CONVERTER
Morgan F. Reynolds, Rte. 1, Box 441-B,
Leesburg, Fla. 32748
Filed July 16, 1965, Ser. No. 472,639
6 Claims. (Cl. 60—54)

This invention relates to the transmission of power from a driving force to a driven member and to automatically and manually variable apparatus by which such driving power is transmitted.

The invention relates particularly to an automatically and manually variable torque converter utilized in the transmission of power from a driving force such as the engine of an automobile to a driven member such as the drive wheels thereof.

Heretofore, many efforts have been made to transmit driving torque from an engine or other source of power to a driven member by means of torque converters; however, these prior devices have been too large, expensive, difficult to install and maintain, or have not been entirely successful for other reasons, including the inability of the devices to vary the ratio between the driving and driven members.

It is an object of the invention to provide a torque converter for transmitting power from a power plant to a driven member in which such torque converter has flexible curved vanes each of which has a reverse curved portion on the free end and such vanes normally maintain a substantially constant drive ratio between the driving and driven members but can flex to alter the drive ratio when increased power is applied to the driving member or increased drag is exerted on the driven member or both.

Another object of the invention is to provide a torque converter having manually operable means for altering and controlling the rigidity of the flexible vanes, thereby establishing different power ratios when desired.

Figure 1:
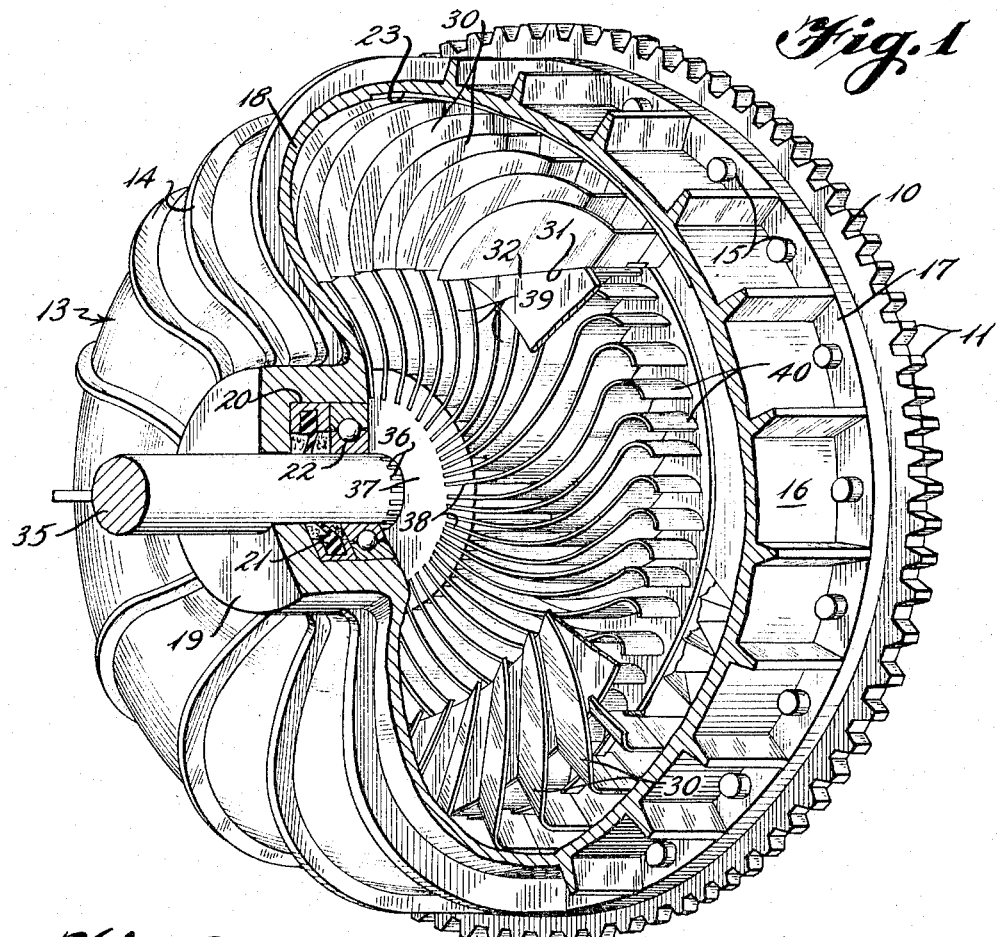
Figure 2:
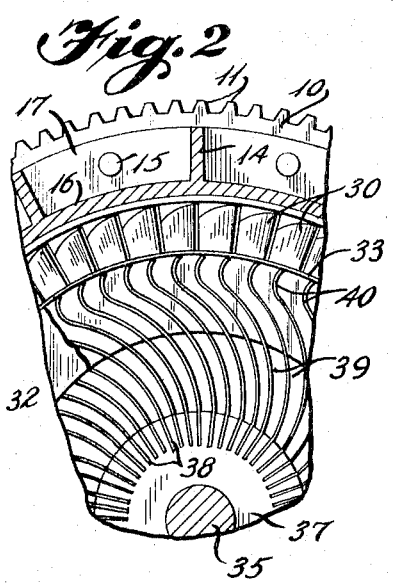
Figure 3:
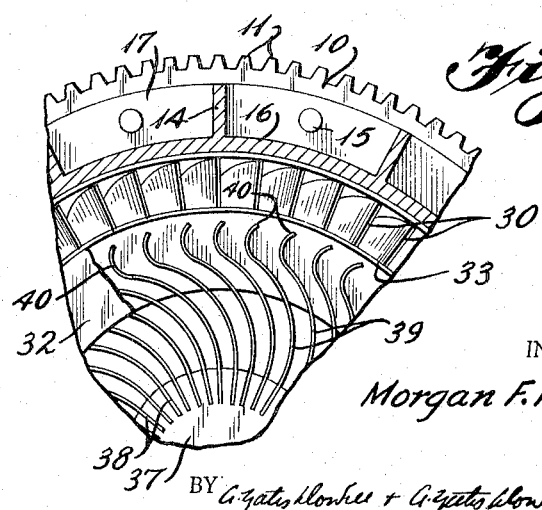
Figure 4:
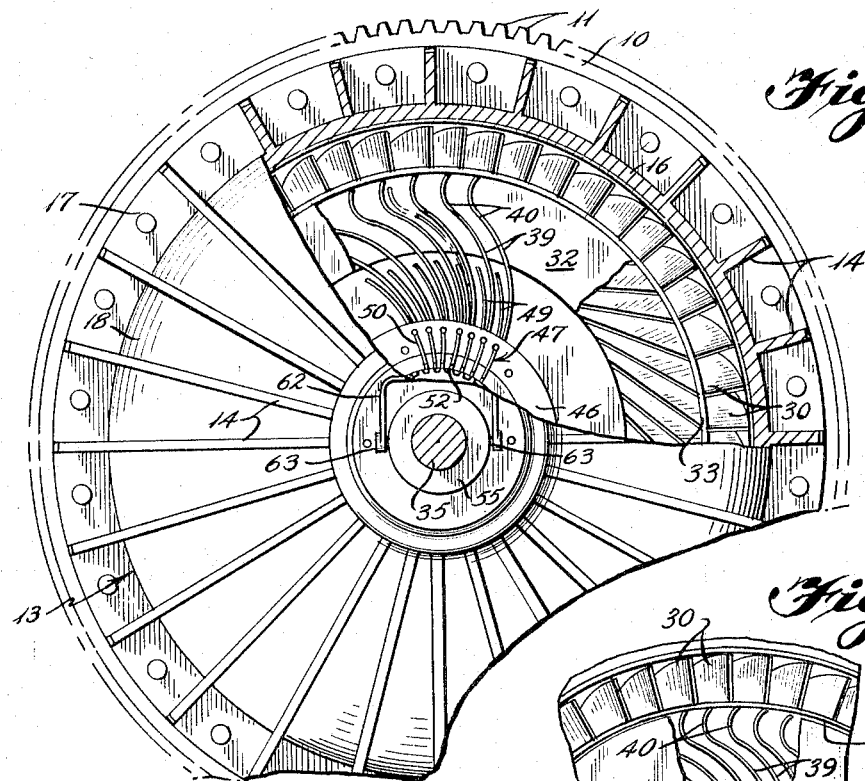
Figure 5:
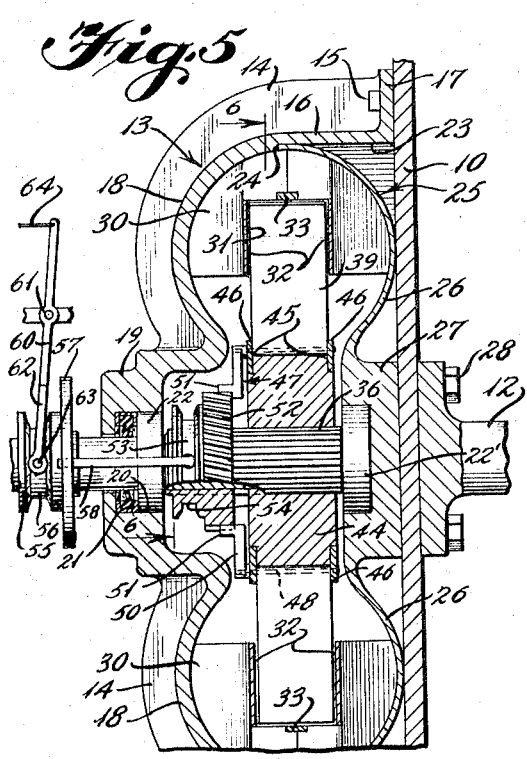
Figure 6:
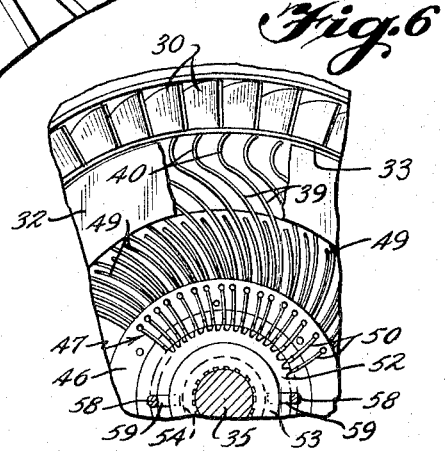

Other objects and advantages of the invention will be apparent from the following description taken in conjunction with the accompanying drawings in which:

FIG. 1 is a perspective of a torque converter with portions broken away for clarity and illustrating one application of the invention;

FIG. 2, a fragmentary vertical section thereof illustrating the normal position of the vanes when maintaining a constant drive ratio;

FIG. 3, a section similar to FIG. 2 illustrating one position of the vanes when the drive ratio has been altered;

FIG. 4, a fragmentary side elevation of a modified form of the invention with portions broken away;

FIG. 5, a fragmentary vertical section of the structure of FIG. 4;

FIG. 6, a section on the line 6—6 of FIG. 5; and

Figure 7:
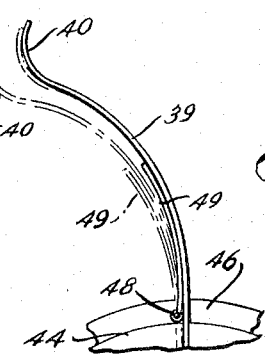

FIG. 7, a detailed side elevation of one of the vanes illustrating the varying degrees of flexibility thereof.

Briefly stated, the present invention is a variable torque converter having a multiplicity of curved flexible vanes, each having a recurved end portion which maintains a substantially constant drive ratio between the driving and driven members during normal operation thereof, but which will automatically alter the drive ratio when increased power is applied to the driving member or increased drag is exerted on the driven member. The invention also contemplates manually or automatically operated means by which the degree of flexibility of the vanes can be altered as desired.

With continued reference to the drawings, a flywheel 10 having gear teeth 11 around the outer periphery thereof is mounted on a drive shaft 12 of a driving member or source of power such as the internal combustion engine of an automobile (not shown). The teeth 11 mesh with the cooperating teeth of a starter motor gear (not shown) and form no part of the invention.

A housing 13, which may have exterior heat dissipating fins 14, is mounted on the flywheel 10 in any desired manner, as by screws or other fasteners 15. The housing 13 has a generally cylindrical portion 16 connected at one end to a flange 17 through which the fasteners 15 extend and the opposite end of such cylindrical portion fairs into an arcuate portion 18 which terminates in an outwardly extending hub 19. Such hub has a recess 20 in which an oil seal 21 and a bearing 22 are located. A recess 23 is provided around the inner periphery of the cylindrical portion 16 terminating in a shoulder 24 substantially at the point of tangency of the arcuate portion 18 for the reception of an inner auxiliary housing 25. The housing 25 includes an arcuate portion 26 complementary to the arcuate portion 18 and a hub 27 fixed to the flywheel 10 by fasteners 28 which also connect the drive shaft 12 to such flywheel.

A plurality of generally V-shaped scoops or baffles 30 are mounted around the arcuate portions 18 and 26 and each of such scoops has a generally radially disposed recess 31 in which a pair of spaced opposed rings 32 are mounted. The bottoms of the recesses 31 are connected by a relatively narrow sleeve 33 for a purpose which will be described later.

A driven shaft 35 extends inwardly through the hub 19 and the bearing 22 and terminates in a thrust bearing 22' mounted within the hub 27. The inner end of such shaft is provided with splines 36 in the area between the bearings 22 and 22'. A collar 37 is non-rotatably mounted on the splines 36 and such collar has a multiplicity of radially disposed slits 38 around its entire periphery. A plurality of flexible curved vanes 39 are provided and such vanes are mounted at one end in each of the slits 38 while the other end of each vane has a recurved portion 40 which normally engages the sleeve 33.

In the operation of the device the housings 13 and 25 are filled approximately three-quarters full of hydraulic or other fluid. When the source of power is energized the drive shaft 12 will rotate the flywheel 10 and the housings 13 and 15 causing the scoops or baffles 30 to force the fluid over and around the rings 32 and into the center of the housings. The fluid will engage the vanes 39 and cause the shaft 35 to be rotated. As long as the drive shaft 12 is rotating faster than the driven shaft 35 the fluid will cause the vanes 39 to flex and move the recurved portion 40 away from the sleeve 33 and increase the drive ratio between the driving and the driven members. As soon as the speed of rotation of the collar 37 reaches substantially the same speed as the housings 13 and 25, the flexible vanes 39 will assume their normal positions and the drive shaft will rotate the driven shaft at substantially a one-to-one ratio.

With reference to FIGS. 4–7, manually operated means is provided for altering the degree of flexibility of the vanes 39. In this modification a collar 44 is mounted on the splines 36 of the driven shaft 35 and such collar is provided with a recess 45 around the outer periphery of each side of such collar for the reception of rings 46 having an outer diameter greater than the diameter of the collar 44. A plurality of cranks 47 are provided, each having an upper arm 48 journaled in the spaced rings 46 and having a curved non-flexible blade 49 connected thereto intermediate such rings. In order to control the position of the blades 49, each crank has an intermediate inwardly extending portion 50 terminating in a rearwardly projecting lug 51. The lugs 51 are received within a helical gear 52 slidably mounted on the splines 36 of the driven shaft 35 and such gear is provided with a hub 53 having a groove 54. Exteriorly of the hub 19 of the housing 13, a shift collar 55 having a groove 56 is rotatably and slidably mounted on the driven shaft 35 and such collar is connected to a yoke 57 having a pair of arms 58 extending through the hub 19 and terminating in inwardly bent end portions 59 which are received within the groove 54 of the hub 53. A shift fork 60 is pivotally mounted intermediate its ends on a pivot pin 61 and such fork is provided with a pair of spaced tines 62 at one end. An inwardly extending pin 63 is mounted on the free end of each of the tines 62 and projects inwardly into the groove 56 of the shift collar 55. The opposite end of the shift fork 60 is connected to a control rod 64 which may be operated either manually or automatically to control the position of the shift collar 55 and the helical gear 52.

In the operation of this modification, when the shift collar 55 is in its rearmost position, the lugs 51 of the cranks 47 are in engagement with the forward portion of the helical gear 52 and the blades 49 are in spaced relation to the vanes 39 to permit relatively free movement and flexibility of such vanes. When it is desired to alter the degree of flexibility of the vanes 39, the control rod 64 is operated to move the lower portion of the shift fork 60 and the shift collar 55 forwardly, and movement of the shift collar causes the arms 58 to move the helical gear 52 axially of the driven shaft 35. Since the helical gear 52 cannot rotate relative to the driven shaft 35, the forward movement of such gear will rotate the cranks 47 and move the blades 49 into closer proximity to the vanes 39 so that when such vanes are flexed they will engage the blades 49 which in turn will resist further flexing.

It will be apparent that a relatively simple variable torque converter has been provided having a plurality of flexible vanes which during normal high speed operation of the driving member will rotate the driven member at substantially a one-to-one ratio, but when increased power is applied to the driving member or increased drag is exerted on the driven member the vanes can flex to alter the drive ratio.

It will be obvious to one skilled in the art that various changes may be made in the invention without departing from the spirit and scope thereof and therefore the invention is not limited by that which is illustrated in the drawings and described in the specification, but only as indicated in the accompanying claims.

What is claimed is:

1. A variable torque converter for transmitting force from an automobile engine to the driving wheels comprising a main housing mounted on the flywheel of the engine, a drive shaft for driving said housing, an auxiliary housing within said main housing and cooperating therewith, a plurality of baffles fixed to said main and auxiliary housings, each of said baffles having a generally radially disposed recess, a driven shaft extending into said housings, a collar mounted on one end of said driven shaft, a plurality of flexible vanes fixed at one end to said collar and extending outwardly into the recesses of said baffles, the major portion of each vane being curved in one direction and having a recurved portion in the opposite direction at the free end thereof, whereby when fluid within said housings is circulated by said baffles it impinges on said vanes to rotate said driven shaft and said vanes will automatically flex under load to vary the drive ratio.

2. A variable torque converter comprising a rotatable housing, a plurality of baffles within said housing, a driven shaft extending into said housing, collar means non-rotatably mounted on said driven shaft, a plurality of flexible vanes fixed at one end to said collar means, each of said vanes being curved in one direction throughout most of its length and having a recurved portion in the opposite direction at its free end, said vanes extending generally radially into close proximity with said baffles, whereby when fluid is introduced into said housing and said housing is rotated, said baffles will cause the fluid to impinge upon said vanes to rotate said driven shaft and the drive ratio between said baffles and said vanes will vary automatically due to the flexibility of said vanes and the recurved portions thereof.

3. The structure of claim 2 in which said baffles have vane receiving recesses.

4. The structure of claim 2 including a plurality of pivotally mounted blades carried by said collar means for cooperating with said vanes, means for controlling the position of said blades relative to said vanes, whereby the amount of flexibility of said vanes can be altered.

5. The structure of claim 4 in which each of said blades is mounted on a crank, helical gear means slidably mounted on said driven shaft and receiving portions of said cranks, and means exteriorly of said housing for moving said helical gear means to control the position of said blades relative to said vanes.

6. A variable torque converter comprising a housing, a plurality of baffles within said housing, each of said baffles having a generally radially disposed recess, a pair of spaced generally parallel rings mounted within the recesses of said baffles, a splined shaft extending into said housing, collar means mounted on said shaft, a plurality of flexible vanes fixed at one end to said collar means, each of said vanes being curved in one direction throughout most of its length and having a recurved portion in the opposite direction at its free end, said vanes extending outwardly from said collar means between said spaced rings and in close proximity to said baffles, a plurality of crank means rotatably mounted on said collar means, a rigid blade connected to each crank, helical gear means slidably and non-rotatably mounted on the splines of said shaft, said helical gear means engaging portions of said cranks, and means for selectively moving said helical gear means to pivot said blades toward and away from said vanes to control the amount of flexibility thereof.

References Cited by the Examiner

UNITED STATES PATENTS

| | | | |
|---|---|---|---|
| 2,168,862 | 8/1939 | De Lavaud | 60—54 |
| 2,186,025 | 1/1940 | Jandasek | 60—54 |
| 2,378,353 | 6/1945 | Zeidler | 60—54 |
| 2,779,292 | 1/1957 | Zeidler | 60—54 X |

EDGAR W. GEOGHEGAN, *Primary Examiner.*